Dec. 7, 1965  E. HAUPT ETAL  3,221,624
LIGHT-MEASURING STRUCTURE FOR CAMERAS
Filed Feb. 14, 1963  4 Sheets-Sheet 1

INVENTORS
Erich Haupt
Hans-Hermann Koeppe
BY
Michael S. Striker
ATTORNEY Dec. 7, 1965  E. HAUPT ETAL  3,221,624
LIGHT-MEASURING STRUCTURE FOR CAMERAS
Filed Feb. 14, 1963  4 Sheets-Sheet 2

INVENTORS
Erich Haupt
Hans-Hermann Koeppe
BY
Michael S. Striker
ATTORNEY

Dec. 7, 1965  E. HAUPT ETAL  3,221,624
LIGHT-MEASURING STRUCTURE FOR CAMERAS
Filed Feb. 14, 1963  4 Sheets-Sheet 3

INVENTORS
Erich Haupt
Hans-Hermann Koeppe
BY
Michael S. Striker
ATTORNEY

United States Patent Office 3,221,624
Patented Dec. 7, 1965

3,221,624
LIGHT-MEASURING STRUCTURE
FOR CAMERAS
Erich Haupt, Sprendlingen, and Hans-Hermann Koeppe, Wiesbaden-Schierstein, Germany, assignors, by mesne assignments, to E. I. du Pont de Nemours and Company, Wilmington, Del., a corporation of Delaware
Filed Feb. 14, 1963, Ser. No. 258,417
Claims priority, application Germany, Feb. 16, 1962,
A 39,493
15 Claims. (Cl. 95—10)

The present invention relates to cameras.

More particularly, the present invention relates to automatic or semi-automatic cameras in which at least part of the exposure-determining structure of the camera is automatically set according to the lighting conditions.

Cameras of this type are conventionally provided with photosensitive elements which receive light and which actuate a device such as a galvanometer so that the angular position of the moving coil of the galvanometer is indicative of the lighting conditions, and this movement of the moving coil of the galvanometer is used in a well-known manner for setting at least part of the camera structure which determines the exposure such as, for example, the diaphragm or the exposure time or both.

Cameras of this general construction are satisfactory for many purposes. For example when making simple black and white photographs or when making color photographs which are not too contrasty out of doors in sufficient sunlight, for example. However, as soon as the subject which is photographed includes highly contrasting colors or when the camera is used to make color photographs under unfavorable weather conditions or with only a relatively small amount of light, then difficulties are encountered, as is also the case when dealing with delicately colored subjects or subjects which are illuminated with side lighting or back lighting. Under these conditions all of the advantages of automatic setting of the camera disappear because it becomes necessary under these conditions to compensate for the automatic setting by changing the automatic setting to an extent which may range beween one-half and one and one-half settings of the diaphragm, and of course such operations require the operator to exercise as much consideration as with a purely manual camera except that with some automatic cameras instead of changing the diaphragm or exposure time settings, in order to provide the necessary compensation, it may be necessary to change the setting of the film speed.

With conventional cameras of the type referred to above, the photosensitive element faces the subject while the camera is held by the operator aimed at the subject in order to make a photograph thereof, and thus the measurement of the light involves measuring the reflected light which comes from the subject. Under the above-discussed conditions where such a reflected light measurement will not give a proper setting of the camera, the operator will measure the incident-light. This is accomplished by placing a light-diffusing, transparent element in front of the photosensitive unit of the light-measuring structure and positioning the camera at the position of the subject with the camera facing in the same direction as the subject, which is to say in a direction opposite from the direction in which the camera faces when an exposure is made to provide a photograph of the subject, and in this way the light which reaches the photosensitive element of the light-measuring structure is the very same light which falls on the subject which is to be photographed, so that with such a measurement a far more accurate setting is obtained and it is unnecessary to provide any compensation of the type referred to above. While it will be necessary to place the camera, during measurement of incident light, precisely at the location of the most important part of the subject, in general it is sufficient if the photosensitive element simply faces in the same direction as the subject even though it is not in precisely the same location as the subject so that in this way the photosensitive element will receive substantially the same light as the subject which is to be photographed. It is only under exceptional circumstances that an incident-light measurement cannot be made. For example, when photographing an animal which cannot be approached very closely, or when photographing a subject to which access cannot be had, it will not be possible to position the camera at the location of the subject, and under some circumstances it simply is not possible to provide the camera with the same light which reaches the subject, so that under these cases the measurement will ordinarily be made with the reflected light method. Otherwise, under the special circumstances mentioned above where extreme accuracy is required, an incident-light measurement will be made.

It is a primary object of the present invention to provide a camera which on the one hand can take reflected light measurements in the usual way and which on the other hand can very easily be manipulated for the purpose of making an incident-light measurement, so that compensation for the settings will not be required, as outlined above.

It is a further object of the present invention to provide a camera which can take either reflected or incident-light measurements while permitting the operator simultaneously to view the subject through the viewfinder of the camera.

Still another object of the present invention is to provide a camera which has but a single photosensitive unit and which at the same time can be used either for reflected-light measurements or incident-light measurements, while also permitting the subject to be viewed through the viewfinder while the light is measured according to either of these methods.

It is also an object of the present invention to provide a camera which is capable of automatically rendering one or the other of a pair of photosensitive elements operative according to whether the camera is to be set with incident light or reflected light.

It is also an object of the present invention to provide a structure of the above type which does not undesirably increase the size of the camera and which is at the same time extremely simple and inexpensive in its construction and also simple to operate so that no special training is required to enable the camera of the invention to be used by amateurs.

With these objects in view the invention includes, in a camera, a camera housing and a support means carried thereby, this support means supporting a carrier means of the invention for movement between a reflected-light position and an incident-light position. When the carrier means is in its incident-light position, it projects from the camera housing to an extent which is substantially greater than when the carrier means is in its reflected-light position. A photosensitive means, which may be a simple photo-cell or an electrical resistor whose resistance varies with variations in light intensity, is carried by the carrier means for movement therewith, and this photosensitive means is located relatively close to the camera housing when the carrier means is in its reflected-light position and relatively distant from the camera housing when the carrier means is in its incident-light position. The photosensitive means faces forwardly toward a subject which is to be photographed at least when the carrier means is in its reflected-light position, and the photosensitive means faces rearwardly away from the subject at least when the carrier means is in its incident-light position. A light-diffusing means is also carried by the carrier means, and this light-diffusing means covers the photosensitive means at least when the latter faces rearwardly away from the subject.

The novel features which are considerd as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
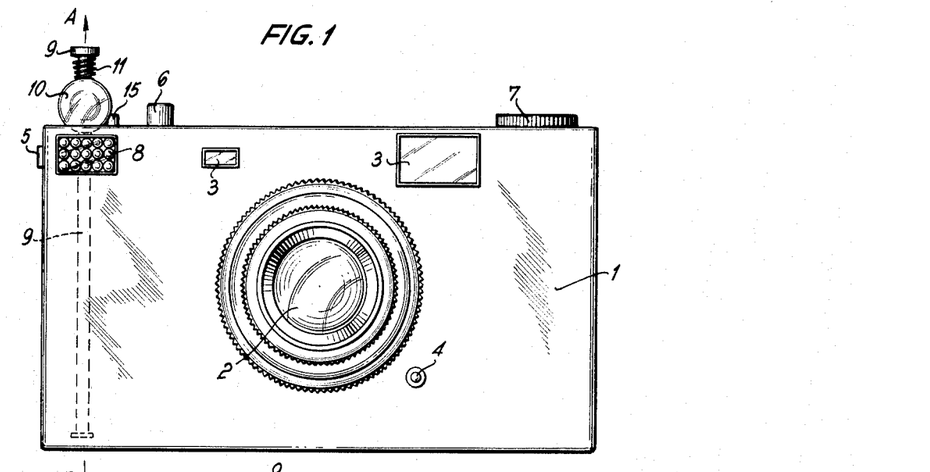
FIG. 1 is a partly diagrammatic front elevation of one possible construction of a camera according to the present invention.

As may be seen from FIG. 1, the camera illustrated therein includes a camera housing 1 which in a well-known manner carries an objective 2. Also, the camera carries the view and range-finder structure which includes the windows 3, and in addition there is an electrical connection 4 for a flash apparatus. Furthermore, there is diagrammatically illustrated a lever 5 which can be actuated for advancing the film, and there is also a release plunger 6 which is actuated in order to trip the shutter so as to make an exposure. In addition, there is diagrammatically illustrated the film-rewinding knob 7, and there is also apparent in FIG. 1 a honeycomb lens 8 which forms a window through which light reaches a photosensitive element of the light measuring structure which is not illustrated in detail. Thus, as may be seen from FIG. 2, there is located behind the window 8 a photosensitive element 14, which may be in the form of a photocell or an electrical resistor whose resistance changes with changes in light intensity, as is well-known in the art, and this photosensitive element 14 is electrically connected in a manner well-known in the art with an instrument such as a galvanometer whose rotor or moving coil will assume angular positions corresponding to the light intensity, and in a manner which is also well-known in the art the angular movement of the rotor of the galvanometer can be used for the purpose of setting either the exposure time or the aperture of the camera or both the exposure time and the aperture. Where the element 14 is a photocell it will be connected through suitable wires with the galvanometer, while where a light-sensitive resistor is used, the electrical circuit will include a battery.

Figures 2, 4:
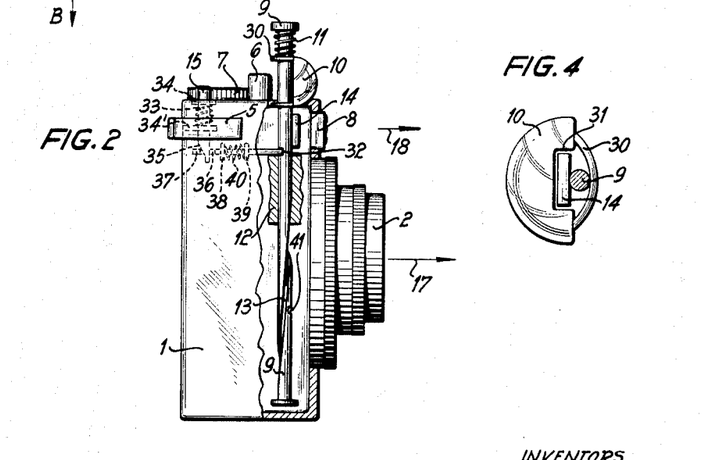
FIG. 2 is a partly sectional side elevation of the camera of FIG. 1 as seen from the left of FIG. 1.
FIG. 4 is a partly sectional view, taken along line 4—4 of FIG. 3 in the direction of the arrows, and showing the position of the photosensitive element when set for making an incident-light measurement.
Figure 3:
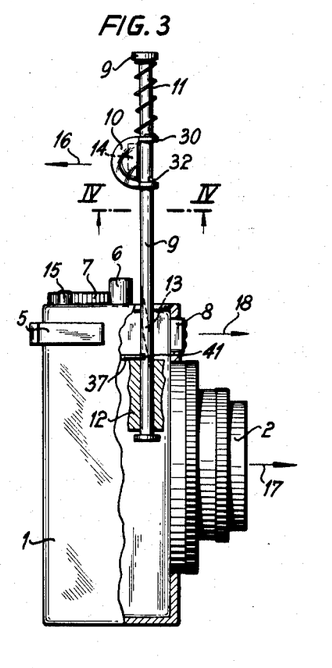
FIG. 3 shows the structure of FIG. 2 in a position for making an incident-light measurement, whereas the structure is shown in FIG. 2 in the position for making a reflected-light measurement.

With the embodiment of the invention which is illustrated in FIGS. 1–4, the camera housing 1 carries, in its interior, a support means 12, and this support means 12 supports a carrier means 9 for movement between reflected-light and incident-light positions, as will be apparent from the description below. The carrier means 9 is shown in FIGS. 1 and 2 in its reflected-light position and in FIG. 3 in its incident-light position. The carrier means 9 is in the form of an elongated rod of circular cross-section which extends through a vertical bore of the support means 12 in a direction perpendicular to the optical axis of the camera, and at its lower portion the rod 9 is formed with a thread 13 which threadedly cooperates with a thread formed in the bore of the support means 12. The construction of the thread 13 is such that when the rod 9 is raised from the position of FIG. 2 to that of FIG. 3 the rod 9 will not only shift longitudinally along its axis, but in addition it will turn through an angle of 180° about its axis, so that not only is the elevation of the rod 9 different in FIGS. 2 and 3 but in addition the rod 9 has been displaced through an angle of 180° when moved between the positions thereof shown in FIGS. 2 and 3. The carrier means or rod 9 extends through a suitable opening formed in the top wall of the camera housing 1, and this opening in addition is large enough to permit the photosensitive means 14 to pass through the opening in the top wall of the camera housing. The photosensitive element 14 is carried directly by the carrier means 9 and suitable flexible wires interconnect the photosensitive means 14 with the galvanometer or the like, referred to above, so that the electrical connection between the photosensitive means 14 and the galvanometer is maintained during movement of the carrier means 9 between the positions thereof shown in FIGS. 2 and 3. In the reflected-light position of the carrier means 9, which is illustrated in FIG. 2, the photosensitive means 14 faces in the same direction as the objective 2 of the camera, which is to say in the direction of the arrow 18 which is parallel to the direction 17 of the optical axis, as shown in FIGS. 2 and 3, and thus the photosensitive means 14 will receive in this position light which passes through the window 8, this light being light which is reflected from the subject which is to be photographed. On the other hand, when the carrier means has been displaced to the position shown in FIG. 3, the photosensitive means 14 faces rearwardly away from the subject which is to be photographed, and it will be noted from FIG. 3 that at this time the photosensitive means 14 faces in the direction of the arrow 16 which is directed oppositely to the arrow 17 while being parallel thereto.

As is well-known in the art, it is necessary to place in front of the photosensitive element 14 a transparent, light-diffusing member when measurement of the light is made according to the incident-light method, and for this purpose there is provided a hollow, hemispherical, light-diffusing member 10 which is also carried by the carrier means 9. This light-diffusing means 10 may be made from plastic sheet which is not clear but instead is frosted or of a whitish color so that it will have light-diffusing capabilities. A pair of straps 30 which are integral with the light-diffusing means 10 extend around the rod 9 so as to support the light-diffusing means 10 for axial movement along the rod 9, and at its lowermost portion the light-diffusing means 10 is formed with a notch 31 (FIG. 4) enabling the light-diffusing means 10 to move over the photosensitive means 14 to the position indicated in FIG. 3. A spring means is provided for urging the light-diffusing means 10 to the position where it covers the photosensitive means 14, and in the illustrated example this spring means takes the form of a coil spring 11 coiled around the upper portion of the rod 9, engaging with its top end an enlarged head end at the top of the rod 9, and engaging with its bottom end the upper part of the light-diffusing means 10, including the upper strap 30 thereof, so that in this way when the rod 9 is raised from the position of FIG. 2 into the incident-light position of FIG. 3, the light-diffusing means 10 will be automatically displaced downwardly with respect to the rod 9 to the position illustrated in FIG. 3 where it covers the photosensitive means 14, and it is this means 14 itself which engages the inner surface of the hollow hemisphere 10 to limit the downward movement thereof by the spring 11. It will be noted that the thread 13 is located only along approximately the lower half of the rod 9 so that the turning of the latter takes place only during approximately the final half of the upward movement of the rod 9 and the initial half of the downward movement thereof. When the rod 9 has almost reached the position shown in FIG. 2 the light-diffusing means 10 engages the upper part of the camera housing 1 and the continued downward movement of the rod 9 is made in opposition to the spring 11 so that the housing 1 itself acts to prevent the movement of the light-diffusing means 10 all the way down with the photosensitive unit 14 so that the latter will be displaced through the opening 31 out of the light-diffusing means 10 into the position shown in FIG. 2 where the reflected light measuring process will be provided.

A manually operable releasable holding means is provided for releasably holding the carrier means 9 in its reflected-light position shown in FIG. 2, and for this purpose the rod 9 is formed with a notch 32 which faces rearwardly when the rod 9 is in the angular position illustrated in FIG. 2. A manually operable plunger 15 extends through the top wall of the camera to the exterior thereof so as to be accessible to the operator, and this plunger 15 is guided for vertical movement by a suitable bearing member 32 which is supported in the interior of the camera housing 1. A coil spring 33 surrounds the plunger 15, engages with its bottom end the bearing 32 and with its top end a collar 34 which is fixed to the plunger 15 so that in this way the plunger 15 is urged upwardly to the position illustrated in FIG. 2, and the collar 34 engages the underside of the top wall of the camera in order to limit the upward movement of the plunger 15 which extends through a suitable opening in the top wall. The plunger 15 is provided at its lower rear portion with an inclined camming edge 35 which is inclined downwardly toward the right, as shown in FIG. 2, and this bottom end portion of the plunger 15 extends through an opening 36 which is formed in an elongated bar 37 supported for movement in a direction parallel to the optical axis by a stationary bearing 38 located in the interior of the camera housing. The bar 37 carries, fixedly, a collar 39 located forwardly of the bearing 38, and between the bearing 38 and the collar 39 a coil spring 40 is coiled about the bar 37 so as to urge the front end thereof forwardly into the notch 32 of the carrier means 9 when the latter is in the position shown in FIG. 2. Thus, in order to release the rod 9 for upward movement to the incident-light position thereof, it is only necessary for the operator to depress the plunger 15, whereupon its camming edge 35 engages the rear end of the opening 36 to move the bar 37 rearwardly in opposition to the spring 40, and thus the front end of the bar 37 will be displaced out of the notch 32 so that the spring 11 will immediately displace the rod 9 upwardly through a certain distance. The spring 11 expands at this time to displace the rod 9 upwardly with respect to the light-diffusing means 10 through a distance which locates the photosensitive means 14 in the interior of the light-diffusing means 10 in engagement with the inner surface thereof at an upper portion thereof, and thereafter the operator will manually raise the rod 9 through the remainder of the distance required to displace it to the incident-light position indicated in FIG. 3. The rod 9 is provided with an additional notch 41 which receives the front end of the bar 37 when the rod 9 is in the incident-light position shown in FIG. 3, so that the manually operable releasable holding means acts also to releasably hold the carrier means 9 in its incident-light position shown in FIG. 3.

In the incident-light position of the carrier means 9 which is shown in FIG. 3, the photosensitive means 14 will receive substantially the same light which is received by the subject which is photographed and toward which the objective of the camera is pointed. It will be noted that in its incident-light position the carrier means 9 extends from the camera housing 1 to an extent which is substantially greater than the extent to which it projects therefrom in the reflected light position shown in FIG. 2. With the parts in the position shown in FIG. 3 the operator can hold the camera and look through the viewfinder thereof at the subject, and the carrier means 9 is designed so that it will locate the photosensitive unit 14, in the incident-light position of FIG. 3, at a distance from the camera housing 1 which is sufficiently great to prevent any shadows from the head of the operator from falling on the photosensitive unit 14 when the carrier means 9 is in its incident-light position.

Should the operator wish to return the parts from the incident-light position of FIG. 3 to the reflected-light position of FIG. 2, the operator will then simply again depress the plunger 15 so as to displace the bar 37 out of the notch 41, and now the operator will be able to return the rod 9 back to the position thereof shown in FIG. 2, at which time the rod or bar 37 will again snap into the notch 32, and of course at this time the photosensitive means 14 will face forwardly and will be located behind the window 8, as described above. Of course, the window 8, instead of taking the form of a honeycomb lens, can be in the form of a suitable grid formed with independent openings through which the light passes in order to reach the photosensitive means 14, as is well-known in the art.

Figure 5:
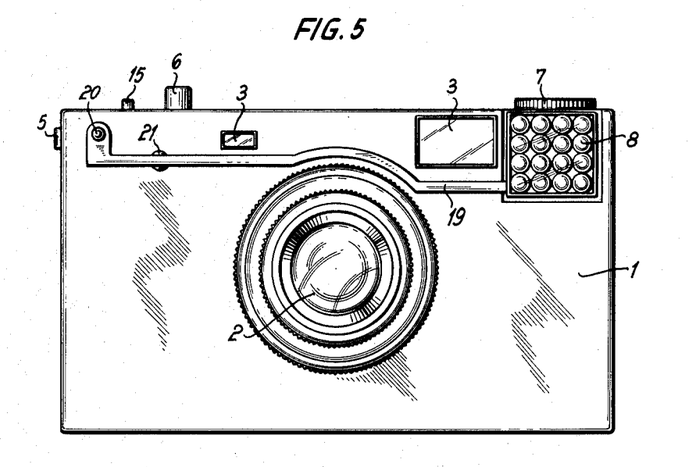
FIG. 5 is a front elevation of another embodiment of a camera constructed according to the present invention.

According to the embodiment of the invention which is illustrated in FIGS. 5-10 and 12, the carrier means takes the form of an elongated lever 19. The housing 1 again carries a support means, which in this case is in the form of a pivot pin 20 carried by the front wall of the camera housing at an upper edge portion thereof, and the elongated lever 19 is pivotally supported at its left end, as viewed in FIG. 5, by the support means 20 for movement to and from the reflected-light position indicated in FIG. 5, and in this position the carrier means 19 extends along the upper edge portion of the front wall of the camera housing 1 at the exterior thereof, as is apparent from FIGS. 5 and 6. In this embodiment also the carrier means directly carries the photosensitive unit 14, but the photosensitive means of this embodiment includes in addition to the unit 14 a second photosensitive unit 22 which is also directly carried by the carrier means 19, and both of these photosensitive units are located at the end portion of the lever 19 which is opposite from the end portion thereof which is pivotally supported by the support means 20. With this embodiment the photosensitive unit 14 faces forwardly at all times toward the subject which is to be photographed, while the photosensitive unit 22 faces rearwardly at all times, away from the subject which is to be photographed, and the carrier means 19 fixedly carries the light-diffusing means 10 which is mounted in a position covering the photosensitive unit 22 at all times. The upper right corner of the housing 1, as viewed in FIG. 5, is formed with a suitable recess which receives the light-diffusing means 10, as is apparent from FIG. 6, when the carrier means 19 is in its reflected-light position shown in FIGS. 5 and 6.

Figure 7:
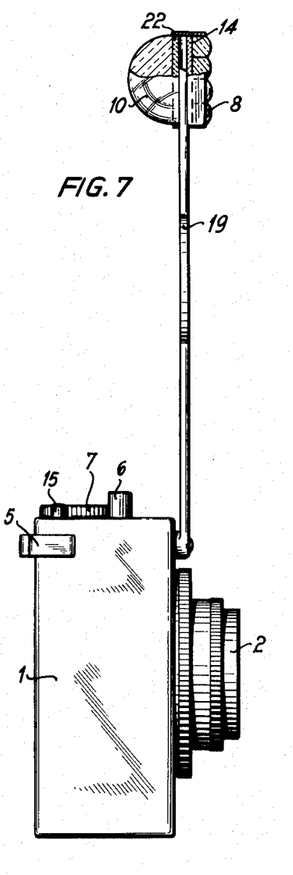
FIG. 7 is a side elevation of the camera of FIGS. 5 and 6, as seen from the left of FIGS. 5 and 6, with the structure set for making incident-light measurements.
Figure 8:
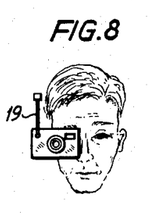
FIGS. 8–10 respectively illustrate various different positions which are possible with the structure of FIGS. 5–7.
Figure 9:
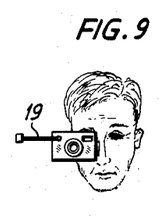
Figure 10:
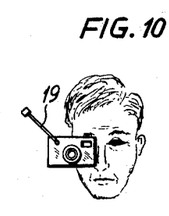

In order to actuate the camera with an incident-light measurement, with this embodiment, the operator will simply turn the carrier means 19 upwardly past the upper edge portion of the front wall of the camera housing 1 to the position shown in FIG. 7, for example, although the operator may turn the carrier means 19 also through the position indicated in FIGS. 9 and 10 diagrammatically the position indicated in FIG. 8 corresponding to that of FIG. 7.

Figure 6:
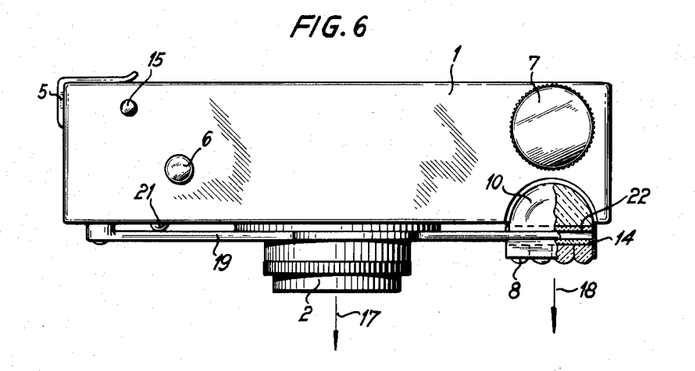
FIG. 6 is a top plan view of the structure of FIG. 5.

A switch means 21 is provided for rendering the photosensitive unit 14 operative when the carrier means 19 is in its reflected-light position shown in FIGS. 5 and 6 and for rendering the photosensitive unit 22 operative when the carrier means 19 is in the incident-light position thereof shown in any of FIGS. 7–10. As may be seen from FIG. 12, the switch means 21 is located in circuit with the pair of photosensitive units 14 and 22, which in this case are in the form of photocells, as well as with the galvanometer 45. A spring 46 is operatively connected with the switch means 21 for urging the latter to the position where the photosensitive unit 22 is operative and where the photosensitive unit 14 is rendered inoperative. When the carrier means 19 is in the reflected light position thereof shown in FIGS. 5 and 6, this carrier means 19 itself engages the switch 21 for displacing the latter in opposition to the spring 46 to the position where the photosensitive unit 14 is located in the circuit and the photosensitive unit 22 is rendered inoperative. When released to the spring 46, the switch member 21 will be urged forwardly through an opening in the front wall of the camera housing 1, and the lever 19 engages a spherically curved front end of the switch member to displace the latter rearwardly in opposition to the spring 46 to the position where the circuit is completed through the photosensitive unit 14. Thus, when the lever 19 is turned upwardly to its incident-light position the switch 21 will automatically assume a position which renders the rearwardly-facing photosensitive unit 22 operative. Thus, the switch means 21 will automatically operate to render one or the other of the photosensitive units 14 or 22 operative depending upon the position of the carrier means 19. Of course, it should be noted that with the carrier means 19 in the incident-light position thereof shown in any of FIGS. 7–10, if the operator should desire to operate the camera with a reflected-light measurement, then it is not absolutely essential for the operator to immediately return the carrier means 19 to the position of FIGS. 5 and 6 since the operator can simply depress the switch 21 manually in order to render the unit 14 operative, and thus if a quick change-over from one to the other type of light measurement is desired without moving the eye of the operator away from the viewfinder, this is easily possible with the embodiment of FIGS. 5–10 and 12. The pivot pin 20 engages in an opening of the lever 19 with a friction which is sufficient to enable the lever 19 to remain in whichever position it is turned to by the operator.

As is apparent from FIGS. 8–10, it is possible for the operator to place the carrier means 19 in any one of a number of different locations relative to the camera housing when making an incident-light measurement, and it will be noted that in all positions the distance of the outer end of the lever 19, where the photosensitive means is located, from the camera housing is sufficiently great to prevent shadows from the uncovered head of the operator from falling on the photosensitive means.

Of course, it is not essential with the embodiment of FIGS. 1–4 that the carrier means 19 extend upwardly through an opening in the top wall of the camera. If desired the elongated rod 9 may extend horizontally through an end wall of the camera housing so that in this case a position corresponding to that of FIG. 9 could be provided with the structure of FIGS. 1–3, and if desired the support means 12 may be in the form of a ball of a ball and socket joint enabling the rod 9 to be situated at any desired angular attitude after it is moved out to its incident-light position.

Figure 11:
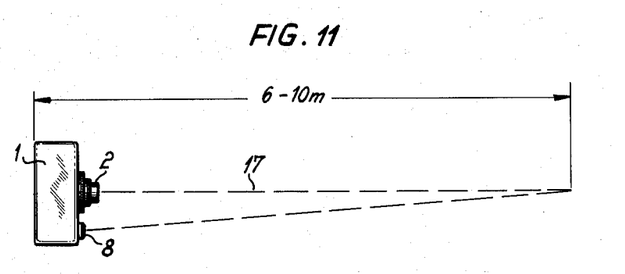
FIG. 11 illustrates the relationship between the camera parts and a subject which is to be photographed.
Figure 12:
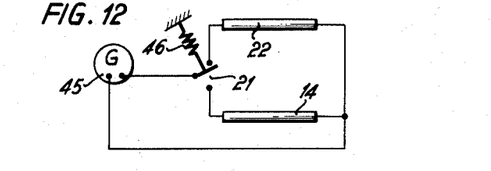
FIG. 12 is a wiring diagram of the embodiment of FIGS. 5–10.

As is apparent from FIG. 11, the distance between the objective 2 and the window 8 is such that when the camera is positioned at a distance of approximately 6–10 meters from the subject the same light will reach the objective and the window 8.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing; support means carried by said camera housing; carrier means supported by said support means for movement between a reflected-light position and an incident-light position, said carrier means, when in its incident-light position, projecting from said housing to an extent greater than when said carrier means is in said reflected-light position thereof; photosensitive means carried by said carrier means for movement therewith and being located relatively close to said housing in said reflected-light position of said carrier means and relatively distant from said camera housing in said incident-light position of said carrier means, said photosensitive means facing forwardly toward a subject to be photographed at least when said carrier means is in said reflected-light position thereof and facing rearwardly away from the subject at least when said carrier means is in said incident-light position thereof; and light-diffusing means also carried by said carrier means and covering said photosensitive means at least when the latter faces rearwardly.

2. In a camera, in combination, a camera housing; support means carried by said camera housing; carrier means supported by said support means for movement between a reflected-light position and an incident-light position; photosensitive means carried by said carrier means for movement therewith and facing forwardly toward a subject to be photographed at least when said carrier means is in said reflected-light position thereof and facing rearwardly away from the subject at least when said carrier means is in said incident-light position thereof; and light-diffusing means also carried by said carrier means and covering said photosensitive means at least when the latter faces rearwardly.

3. In a camera, in combination, a camera housing; support means carried by said camera housing; carrier means supported by said support means for turning movement between a reflected-light position and an incident-light position, said carrier means, when in its incident-light position, projecting from said housing to an extent greater than when said carrier means is in said reflected-light position thereof; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed at least when said carrier means is in said reflected-light position thereof and facing rearwardly away from the subject at least when said carrier means is in said incident-light position; and light-diffusing means also carried by said carrier means and covering said photosensitive means at least when the latter faces rearwardly.

4. In a camera, in combination, a camera housing; support means carried by said camera housing; elongated carrier means having an axis extending perpendicularly with respect to the optical axis of the camera, said carrier means being supported by said support means for simultaneous longitudinal and rotational movement about its axis between a reflected-light position and an incident-light position, said carrier means, when in its incident-light position, projecting from said housing to an extent greater than when said carrier means is in said reflected-light position thereof and said carrier means being displaced through an angle of substantially 180° about its axis during movement between said positions; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed when said carrier means is in said reflected-light position thereof and facing rearwardly away from the subject when said carrier means is in said incident-light position thereof; and light-diffusing means carried by said carrier means for movement with respect thereto between a position uncovering said photosensitive means when said carrier means is in said reflected-light position thereof and covering said photosensitive means when said carrier means is in said incident-light position thereof.

5. In a camera, in combination, a camera housing; support means carried by said camera housing; elongated carrier means having an axis extending perpendicularly with respect to the optical axis of the camera, said carrier means being supported by said support means for simultaneous longitudinal and rotational movement about its axis between a reflected-light position and an incident-light position, said carrier means, when in its incident-light position, projecting from said housing to an extent greater than when said carrier means is in said reflected-light position thereof and said carrier means being displaced through an angle of substantially 180° about its axis during movement between said positions; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed when said carrier means is in said reflected-light position thereof and facing rearwardly away from the subject when said carrier means is in said incident-light position thereof; light-diffusing means carried by said carrier means for movement with respect thereto between a position uncovering said photosensitive means when said carrier means is in said reflected-light position thereof and covering said photosensitive means when said carrier means is in said incident-light position thereof; and manually operable releasable holding means carried by said camera housing and engaging said carrier means for releasably holding the latter in at least one of said positions thereof.

6. In a camera, in combination, a camera housing; support means carried by said camera housing; elongated carrier means having an axis extending perpendicularly with respect to the optical axis of the camera, said carrier means being supported by said support means for simultaneous longitudinal and rotational movement about its axis between a reflected-light position and an incident-light position, said carrier means, when in its incident-light position, projecting from said housing to an extent greater than when said carrier means is in said reflected-light position thereof and said carrier means being displaced through an angle of substantially 180° about its axis during movement between said positions; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed when said carrier means is in said reflected-light position thereof and facing rearwardly away from the subject when said carrier means is in said incident-light position thereof; light-diffusing means carried by said carrier means for movement with respect thereto between a position uncovering said photosensitive means when said carrier means is in said reflected-light position thereof and covering said photosensitive means when said carrier means is in said incident-light position thereof; and spring means carried by said carrier means and engaging said light-diffusing means for urging the latter to said position covering said photosensitive means, said camera housing engaging said photosensitive means when said carrier means is in said incident-light position thereof for displacing said light-diffusing means with respect to said carrier means in opposition to said spring means to said position where said light-diffusing means uncovers said photosensitive means.

7. In a camera, in combination, a camera housing; support means carried by said camera housing; elongated carrier means having an axis extending perpendicularly with respect to the optical axis of the camera, said carrier means being supported by said support means for simultaneous longitudinal and rotational movement about its axis between a reflected-light position and an incident-light position, said carrier means, when in its incident-light position, projecting from said housing to an extent greater than when said carrier means is in said reflected-light position thereof and said carrier means being displaced through an angle of substantially 180° about its axis during movement between said positions; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed when said carrier means is in said reflected-light position thereof and facing rearwardly away from the subject when said carrier means is in said incident-light position thereof; light-diffusing means carried by said carrier means for movement with respect thereto between a position uncovering said photosensitive means when said carrier means is in said reflected-light position thereof and covering said photosensitive means when said carrier means is in said incident-light position thereof; and spring means carried by said carrier means and engaging said light-diffusing means for urging the latter to said position covering said photosensitive means, said camera housing engaging said photosensitive means when said carrier means is in said incident-light position thereof for displacing said light-diffusing means with respect to said carrier means in opposition to said spring means to said position where said light-diffusing means uncovers said photosensitive means, said camera housing being formed with a window through which light reaches said photosensitive means when said carrier means is in said reflected-light position thereof.

8. In a camera, in combination, a camera housing; support means carried by said camera housing; elongated carrier means supported by said support means for turning movement about an axis substantially parallel to the optical axis between a reflected-light position and an incident-light position, said carrier means, when in its incident-light position projecting from said housing to an extent greater than when said carrier means is in said reflected-light position thereof; photosensitive means carried by said carrier means for movement therewith and being located relatively close to said housing in said reflected-light position of said carrier means and relatively distant from said housing in said incident-light position of said carrier means, said photosensitive means including a pair of photosensitive units one of which faces forwardly toward a subject to be photographed and the other of which faces rearwardly away from the subject to be photographed; light-diffusing means also carried by said carrier means for movement therewith and covering said other unit of said photosensitive means; and switch means carried by said housing and connected electrically with said units for rendering the forwardly-facing unit operative when said carrier means is in said reflected-light position thereof and the rearwardly facing unit operative when said carrier means is in said incident-light position thereof.

9. In a camera, in combination, a camera housing; support means carried by said camera housing; elongated carrier means supported by said support means for turning movement about an axis substantially parallel to the optical axis between a reflected-light position and an incident-light position, said carrier means, when in its incident-light position projecting from said housing to an extent greater than when said carrier means is in said reflected-light position thereof; photosensitive means carried by said carrier means for movement therewith and being located relatively close to said housing in said reflected-light position of said carrier means and relatively distant from said housing in said incident-light position of said carrier means, said photosensitive means including a pair of photosensitive units one of which faces forwardly toward a subject to be photographed and the other of which faces rearwardly away from the subject to be photographed; light-diffusing means also carried by said carrier means for movement therewith and covering said other unit of said photosensitive means; and switch means carried by said housing and connected electrically with said units for rendering the forwardly-facing unit operative when said carrier means is in said reflected-light position thereof and the rearwardly facing unit operative when said carrier means is in said incident light position thereof, said switch means being automatically actuated by said carrier means when the latter is moved to said reflected-light position thereof for rendering said forwardly-facing unit operative and said switch means being released by said carrier means when the latter is moved to said incident-light position thereof for automatically rendering said rearwardly-facing unit operative.

10. In a camera, in combination, a camera housing; support means carried by said camera housing; elongated carrier means supported by said support means for turning movement about an axis substantially parallel to the optical axis between a reflected-light position and an incident-light position, said carrier means, when in its incident-light position projecting from said housing to an extent greater than when said carrier means is in said reflected-light position thereof; photosensitive means carried by said carrier means for movement therewith and being located relatively close to said housing in said reflected-light position of said carrier means and relatively distant from said housing in said incident-light position of said carrier means, said photosensitive means including a pair of photosensitive units one of which faces forwardly toward a subject to be photographed and the other of which faces rearwardly away from the subject to be photographed; light-diffusing means also carried by said carrier means for movement therewith and covering said other unit of said photosensitive means; and switch means carried by said housing and connected electrically with said units for rendering the forwardly-facing unit operative when said carrier means is in said reflected-light position thereof and the rearwardly facing unit operative when said carrier means is in said incident-light position thereof; and a window through which light reaches said forwardly-facing unit of said photosensitive means, said window also being carried by said carrier means for movement therewith.

11. In a camera, in combination, a camera housing having a front wall provided with an elongated upper edge portion; support means carried by said front wall of said camera housing; carrier means supported by said support means for movement between a reflected-light position and an incident-light position, said carrier means, when in its incident-light position, projecting from said housing to an extent greater than when said carrier means is in said reflected-light position thereof, and said carrier means when in said reflected-light position thereof extending along said upper edge portion of said front wall of said camera housing at the exterior of the latter, said carrier means turning past said upper edge portion of said front wall during movement between said positions thereof; photosensitive means carried by said carrier means for movement therewith and being located relatively close to said housing in said reflected-light position of said carrier means and relatively distant from said housing in said incident-light position of said carrier means, said photosensitive means including a pair of photosensitive units one of which faces forwardly toward a subject to be photographed and the other of which faces rearwardly away from the subject; light-diffusing means also carried by said carrier means and covering said rearwardly-facing unit of said photosensitive means; and switch means carried by said housing and cooperating electrically with said units for rendering said forwardly-facing unit operative when said carrier means is in said reflected-light position thereof and said rearwardly-facing unit operative when said carrier means is in said incident-light position thereof.

12. In a camera, in combination, a camera housing having a front wall provided with an elongated upper edge portion; support means carried by said front wall of said camera housing; carrier means supported by said support means for movement between a reflected-light position and an incident-light position, said carrier means, when in its incident-light position, projecting from said housing to an extent greater than when said carrier means is in said reflected-light position thereof, and said carrier means when in said reflected-light position thereof extending along said upper edge portion of said front wall of said camera housing at the exterior of the latter, said carrier means turning past said upper edge portion of said front wall during movement between said positions thereof; photosensitive means carried by said carrier means for movement therewith and being located relatively close to said housing in said reflected-light position of said carrier means and relatively distant from said housing in said incident-light position of said carrier means, said photosensitive means includng a pair of photosensitive units one of which faces forwardly toward a subject to be photographed and the other of which faces rearwardly away from the subject, said carrier means being in the form of an elongated lever having a pair of opposed end portions one of which is pivotally connected to said front wall of said camera housing by said support means and the other of which carries said photosensitive means; light-diffusing means also carried by said carrier means and covering said rearwardly-facing unit of said photosensitive means; and switch means carried by said housing and cooperating electrically with said units for rendering said forwardly-facing unit operative when said carrier means is in said reflected-light position thereof and said rearwardly-facing unit operative when said carrier means is in said incident-light position thereof.

13. In a camera, in combination, a camera housing having a top wall formed with an opening passing therethrough; support means carried by said camera housing in the interior thereof; elongated carrier means extending through said opening of said top wall into the interior of said housing and supported by said support means for longitudinal and rotary movement between a reflected-light position and an incident-light position, said carrier means, when in its incident-light position projecting from said top wall of said housing to an extent greater than when said carrier means is in said reflected-light position thereof; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed when said carrier means is in said reflected-light position thereof and facing rearwardly away from the subject when said carrier means is in said incident-light position thereof; and light-diffusing means also carried by said carrier means and covering said photosensitive means when the latter faces rearwardly.

14. In a camera, in combination, a camera housing having a top wall formed with an opening passing therethrough; support means carried by said camera housing in the interior thereof; elongated carrier means extending through said opening of said top wall into the interior of said housing and supported by said support means for longitudinal and rotary movement between a reflected-light position and an incident-light position, said carrier means, when in its incident-light position projecting from said top wall of said housing to an extent greater than when said carrier means is in said reflected-light position thereof; photosensitive means carried by said carrier means for movement therewith and being located relatively close to said housing in said reflected-light position of said carrier means and relatively distant from said housing in said incident-light position of said carrier means, said photosensitive means facing forwardly toward a subject to be photographed when said carrier means is in said reflected-light position thereof and facing rearwardly away from the subject when said carrier means is in said incident-light position thereof, said photosensitive means moving through said opening of said top wall of said camera housing during movement of said carrier means between said positions thereof and said photosensitive means being located in the interior of said housing when said carrier means is in said reflected-light position thereof, said housing having a front wall carrying a window through which light reaches said photosensitive means when said carrier means is in said reflected-light position thereof; and light-diffusing means also carried by said carrier means and covering said photosensitive means when the latter faces rearwardly.

15. In a camera, in combination, a camera housing; support means carried by said camera housing; carrier means supported by said support means for movement between a reflected-light position and an incident-light position, said carrier means, when in its incident-light position, projecting from said housing to an extent greater than when said carrier means is in said reflected-light position thereof; photosensitive means carried by said carrier means for movement therewith and being located relatively close to said housing in said reflected-light position of said carrier means and relatively distant from said camera housing in said incident-light position of said carrier means, said photosensitive means facing forwardly toward a subject to be photographed at least when said carrier means is in said reflected-light position thereof and facing rearwardly away from the subject at least when said carrier means is in said incident-light position thereof, said photosensitive means being located by said carrier means, when the latter is in said incident-light position thereof, from said camera housing by a distance sufficiently great to prevent shadows from the head of the operator from falling on said photosensitive means when the operator looks through the viewfinder of the camera; and light-diffusing means also carried by said carrier means and covering said photosensitive means at least when the latter faces rearwardly.

References Cited by the Examiner
UNITED STATES PATENTS 3,091,166    5/1963    Norwood ____________ 95—64

FOREIGN PATENTS 1,122,676    5/1956    France.

NORTON ANSHER, Primary Examiner.

EMIL G. ANDERSON, Examiner.